US011119012B2

(12) United States Patent
Boguslavsky et al.

(10) Patent No.: US 11,119,012 B2
(45) Date of Patent: Sep. 14, 2021

(54) DEVICE AND METHOD FOR CLEAVING A LIQUID SAMPLE

(71) Applicants: Dimitry Boguslavsky, Haifa (IL); Mark Kovler, Toronto (CA)

(72) Inventors: Dimitry Boguslavsky, Haifa (IL); Mark Kovler, Toronto (CA)

(73) Assignee: IB Labs, Inc., Brooklyn, NY (US)

( * ) Notice: Subject to any disclaimer, the term of this patent is extended or adjusted under 35 U.S.C. 154(b) by 455 days.

(21) Appl. No.: 15/962,426

(22) Filed: Apr. 25, 2018

(65) Prior Publication Data
US 2018/0306685 A1    Oct. 25, 2018

Related U.S. Application Data

(60) Provisional application No. 62/489,968, filed on Apr. 25, 2017.

(51) Int. Cl.
*G01N 1/28*     (2006.01)
*B26F 3/00*     (2006.01)
(Continued)

(52) U.S. Cl.
CPC ............. *G01N 1/286* (2013.01); *B26F 3/002* (2013.01); *B28D 5/0011* (2013.01);
(Continued)

(58) Field of Classification Search
CPC ................. G01N 1/286; G01N 1/2806; G01N 2001/2873; B26F 3/002; B28D 5/0011
See application file for complete search history.

(56) References Cited

U.S. PATENT DOCUMENTS 3,661,727 A * 5/1972 Itoh .......................... C25D 7/12
                                                438/570
5,740,953 A * 4/1998 Smith .................. B28D 5/0005
                                                225/1
(Continued)

OTHER PUBLICATIONS

Johnny L. Carson; "Fundamental Technical Elements of Freeze-fracture/Freeze-etch in Biological Electron Microscopy"; Journal of Visualized Experiments (91); Sep. 11, 2014; 15 pgs.
(Continued)

*Primary Examiner* — Orlando E Aviles
*Assistant Examiner* — Joel D Crandall
(74) *Attorney, Agent, or Firm* — Andrew D. Fortney; Central California IP Group, P.C.

(57) ABSTRACT

An apparatus and method for cleaving a liquid sample are disclosed. The apparatus includes a load lock chamber containing a cleaving module, a cryo-cooler, a vacuum chamber configured to receive the cleaving module from the load lock chamber, and a gate valve between the load lock chamber and the vacuum chamber. The cleaving module is configured to cleave a crystalline sample holder and the liquid sample. The liquid sample includes one or more liquid phase materials and is cleavable by the cleaving module when in the solid phase. The cryo-cooler is configured to cool and/or maintain a temperature of the sample holder and the sample below the melting point of each of the liquid phase materials. The gate valve has at least one opening therein configured to (i) allow the cleaving module to enter and exit the vacuum chamber and/or (ii) permit gaseous communication between the load lock chamber and the vacuum chamber.

20 Claims, 15 Drawing Sheets

(51) Int. Cl.
  *B28D 5/00* (2006.01)
  *G01N 1/42* (2006.01)

(52) U.S. Cl.
  CPC ......... *B28D 5/0023* (2013.01); *G01N 1/2806* (2013.01); *G01N 1/42* (2013.01); *B28D 5/0052* (2013.01); *G01N 2001/2873* (2013.01)

(56) References Cited

U.S. PATENT DOCUMENTS

| | | | | |
|---|---|---|---|---|
| 2002/0079057 | A1* | 6/2002 | Yoshioka | C23F 4/00 156/345.31 |
| 2008/0038908 | A1* | 2/2008 | Henley | H01J 37/3171 438/530 |
| 2008/0078750 | A1 | 4/2008 | Boguslavsky et al. | |
| 2008/0308727 | A1 | 12/2008 | Boguslavsky et al. | |
| 2012/0006786 | A1* | 1/2012 | Boguslavsky | H01J 37/3005 216/41 |
| 2013/0203239 | A1* | 8/2013 | Fadeyev | B23K 26/364 438/462 |
| 2013/0288182 | A1* | 10/2013 | Branton | B81C 1/00531 430/296 |
| 2014/0263524 | A1* | 9/2014 | Stoddard | H01L 31/18 225/2 |
| 2016/0008926 | A1 | 1/2016 | Ciraldo | |
| 2016/0089813 | A1* | 3/2016 | Boguslavsky | B28D 5/0017 125/23.01 |

OTHER PUBLICATIONS

International Search Report and Written Opinion; PCT International Searching Authority/US dated Jun. 27, 2018; International Application No. PCT/US2018/029439; 13 pages, International Searching Authority/United States; Commissioner for Patents; Alexandria, Virginia.

International Preliminary Report on Patentability dated Nov. 7, 2019; International Application No. PCT/US2018/029439; 6 pgs.; The International Bureau of WIPO, Geneva, Switzerland.

* cited by examiner

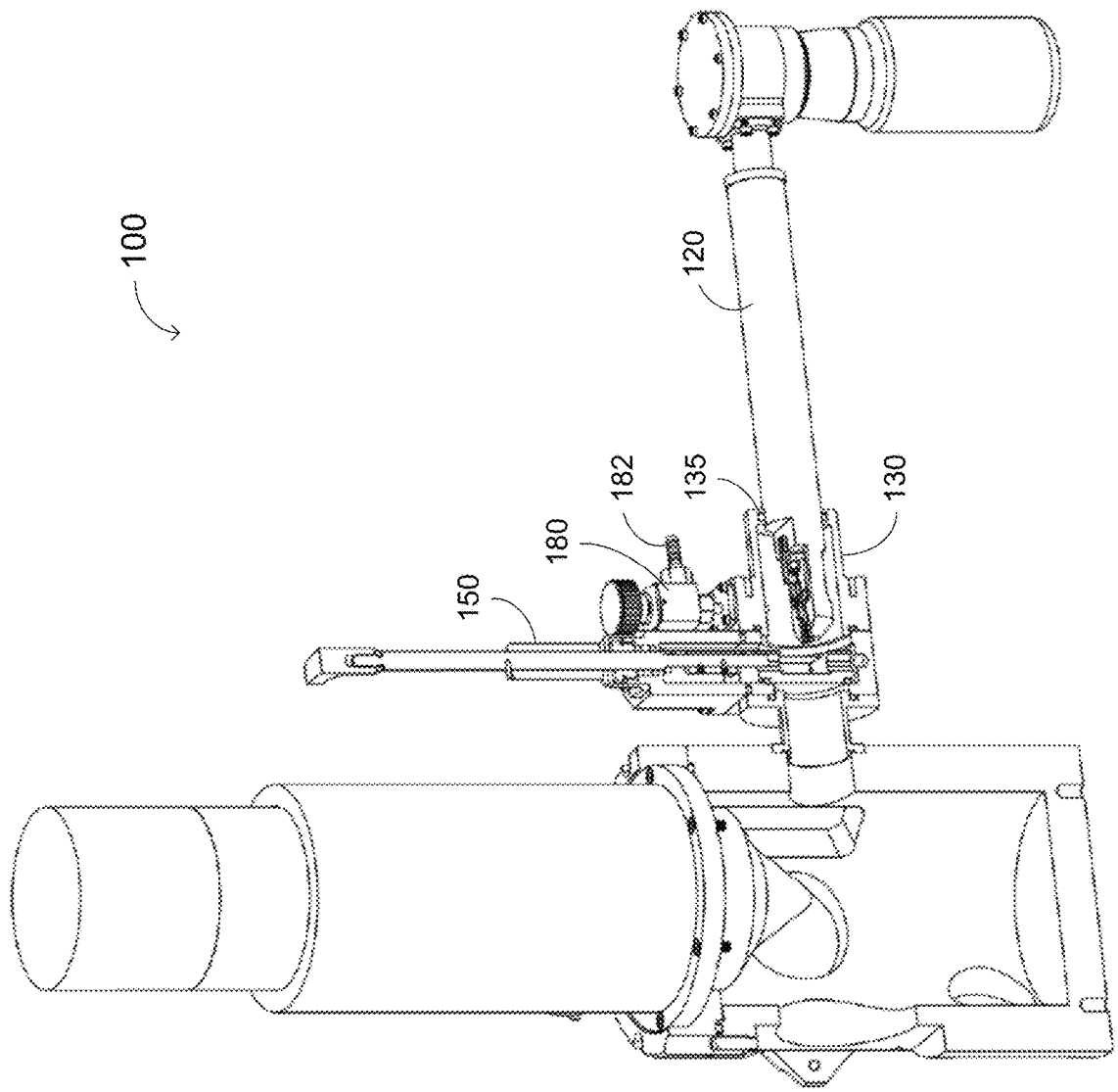

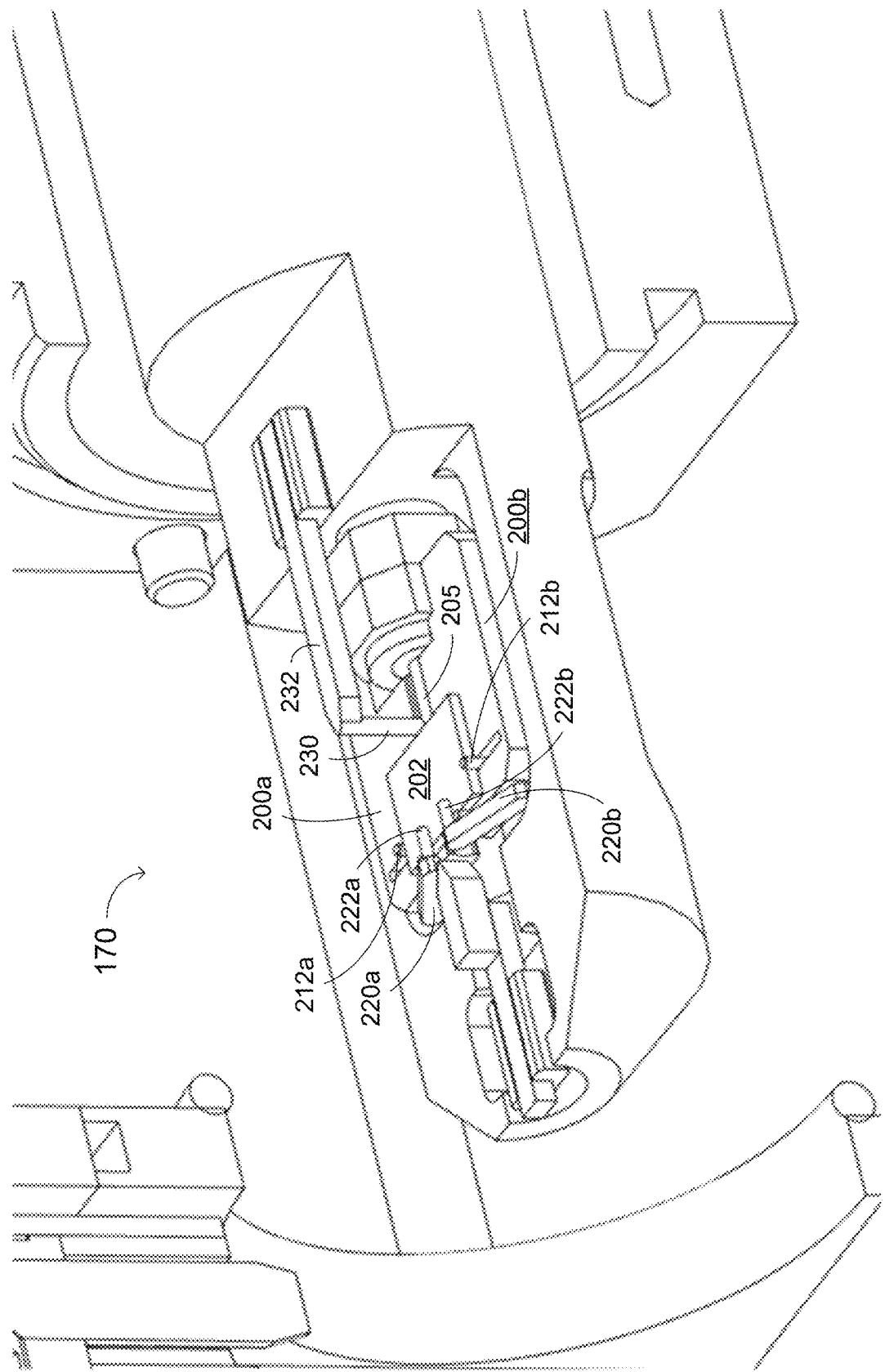

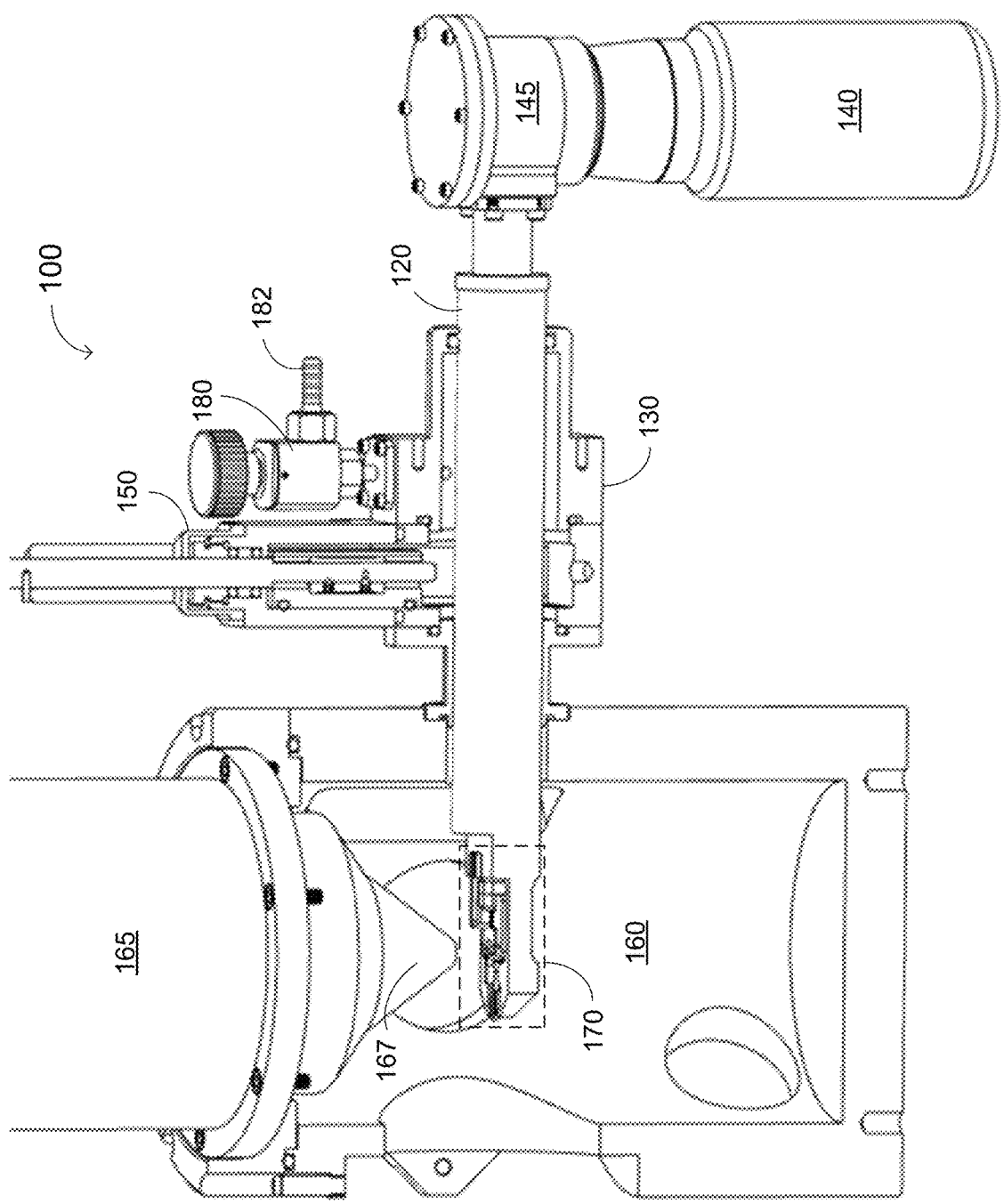

DEVICE AND METHOD FOR CLEAVING A LIQUID SAMPLE

CROSS REFERENCE TO RELATED APPLICATION

This application claims the benefit of U.S. Provisional Patent Application No. 62/489,968, filed on Apr. 25, 2017, incorporated herein by reference as if fully set forth herein.

FIELD OF THE INVENTION

The present disclosure generally relates to an apparatus for and method of cleaving a sample containing liquid-phase material(s), particularly for use in the fields of biology, chemistry, and materials science.

SUMMARY OF THE INVENTION

The disclosed apparatus and method are applicable, but not restricted, to nano-scale and/or precise cross-sectioning for subsequent imaging and micro-analysis, of liquid-phase and soft materials cryogenically or adhesively mounted on a crystalline (e.g., monocrystalline) substrate such as single-crystal Si, GaAs, InP, etc. (e.g., having a <100> crystalline orientation). The apparatus is generally a technological system intended to implement the present cleaving method (e.g., for liquid or soft specimens).

In one aspect, the present invention relates to an apparatus for cleaving a sample containing one or more liquid-phase materials, comprising a load lock chamber containing a cleaving module, a cryo-cooler, a vacuum chamber configured to receive the cleaving module from the load lock chamber, and a gate valve between the load lock chamber and the vacuum chamber. The cleaving module is configured to cleave a crystalline sample holder and the liquid sample. The liquid sample includes one or more materials that are in the liquid phase at ambient temperatures. The liquid sample is cleavable by the cleaving module when on the sample holder and in the solid phase. The cryo-cooler is configured to cool and/or maintain a temperature of the sample holder and the sample below the melting point of each of the liquid-phase materials. The gate valve has at least one opening therein configured to (i) allow the cleaving module to enter and exit the vacuum chamber and/or (ii) permit gaseous communication between the load lock chamber and the vacuum chamber.

In various embodiments, the cleaving module comprises a chuck configured to support the sample holder (e.g., and/or contact a first surface of the sample holder), a cryo-cooling support device configured to cool the sample holder directly or indirectly, a cleaving knife configured to initiate a cleavage line in the sample holder at one end of the sample holder, and/or a cleavage support pin configured to contact an opposite end of the sample holder. In further embodiments, the cleaving module may comprise a plurality of alignment pins configured to contact the one end of the sample holder, a plurality of effector pins configured to contact opposed sides of the sample holder, and/or a plurality of clamps configured to contact a surface of the sample holder opposite or away from the chuck (e.g., opposite from the first surface of the sample holder). In other or even further embodiments, the cleaving module may (further) comprise a cleaving knife stage configured to move the cleaving knife towards and away from the one end of the sample holder (and optionally an actuator configured to move the cleaving knife stage) and/or a cleavage support stage configured to move the cleavage support pin towards and away from the opposite end of the sample holder (and optionally an actuator configured to move the cleavage support stage).

In additional embodiments, the apparatus further comprises electronics, motors and/or mechanical structures configured to move (i) the plurality of effector pins towards and away from the opposed sides of the sample holder, (ii) the plurality of clamps towards and away from the surface of the sample holder, (iii) the cleaving module into and out of the vacuum chamber, (iv) the cleaving knife stage towards and away from the one end of the sample holder, and/or (v) the cleavage support stage towards and away from the opposite end of the sample holder. Alternatively or additionally, the chuck may comprise a plurality of independently moveable or rotatable sections, and optionally, electronics, motors and/or mechanical structures configured to independently move each of the sections.

In various further embodiments, the apparatus may further comprise a load lock cover, configured to open and close the load lock chamber; an imaging device or other analytical instrument configured to image and/or detect one or more structures or other features in the sample; and/or a vacuum system configured to evacuate the load lock chamber and/or the vacuum chamber. Alternatively or additionally, the gate valve may comprise a gate configured to allow the cleavage module into the vacuum chamber when the gate is open and seal the load lock chamber from the vacuum chamber when the gate is closed.

In a further aspect, the present invention relates to a method for cleaving a sample containing one or more liquid-phase materials, the method comprising placing the liquid sample on a crystalline sample holder, wherein the liquid sample includes one or more materials that are in the liquid phase at ambient temperatures; cooling the liquid sample on the sample holder to a temperature below a melting point of each of the materials that are in the liquid phase at ambient temperatures; placing the sample holder on a cleaving module in a load lock chamber, the cleaving module being configured to cleave the sample holder; inserting the cleaving module with the sample holder and the sample thereon in a vacuum chamber; and cleaving the sample holder and the sample with the cleaving module.

In some embodiments, the liquid sample is placed on the sample holder and the liquid sample is cooled to the temperature below the melting point of each of the one or more materials before the sample holder is placed on the cleaving module. In such embodiments of the method, the liquid sample may be cooled to the temperature below the melting point of each of the materials in an external freezer or using liquid nitrogen.

In other embodiments, the sample holder is placed on the cleaving module, the liquid sample is placed on the sample holder, and the liquid sample is cooled to the temperature below the melting point of each of the one or more materials in sequence. In such embodiments, the liquid sample may be cooled to the temperature below the melting point of each of the materials using a cryo-cooler operably connected to the cleaving module.

In various embodiments of the method, the cleaving module may be inserted into the vacuum chamber through an opening in a gate valve between the load lock chamber and the vacuum chamber. As for the present device, the opening may be configured to allow the cleaving module to enter and exit the vacuum chamber. In addition, the cleaving module in the present method may comprise a cleaving knife, and cleaving the sample holder and the sample with the cleaving module may comprise initiating a cleavage line in the sample holder at one end of the sample holder with the cleaving knife. The sample holder may comprise a single crystal material that is at the one end (i.e., that is contacted by the cleaving knife) and on which the sample is placed.

In further embodiments, the method may further comprise viewing, imaging and/or analyzing the cleaved sample.

Advantages of the present invention will become readily apparent from the detailed description of various embodiments below.

BRIEF DESCRIPTION OF THE DRAWINGS

The present invention will be understood and appreciated more fully from the following detailed description taken in conjunction with the drawings in which:

FIGS. 2A-10 illustrate the operation of a more detailed exemplary apparatus configured to cleave a liquid sample according to embodiments of the invention;

DETAILED DESCRIPTION

Figure 1A:
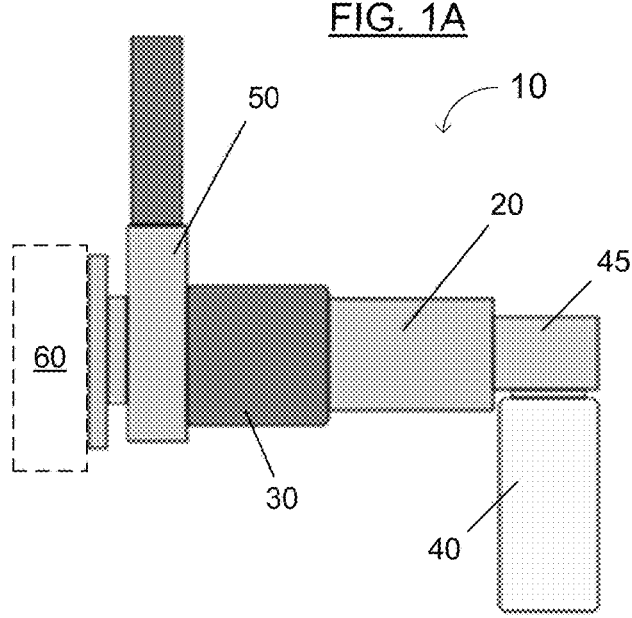
FIGS. 1A-C are general views of components of an exemplary liquid sample cleaving apparatus.

Reference will now be made in detail to various embodiments of the invention, examples of which are illustrated in the accompanying drawings. While the invention will be described in conjunction with the following embodiments, it will be understood that the descriptions are not intended to limit the invention to these embodiments. On the contrary, the invention is intended to cover alternatives, modifications and equivalents that may be included within the spirit and scope of the invention. Furthermore, in the following detailed description, numerous specific details are set forth in order to provide a thorough understanding of the present invention. However, it will be readily apparent to one skilled in the art that the present invention may be practiced without these specific details. In other instances, well-known methods, procedures, components, and materials have not been described in detail so as not to unnecessarily obscure aspects of the present invention.

The technical proposal(s) of embodiments of the present invention will be fully and clearly described in conjunction with the drawings in the following embodiments. It will be understood that the descriptions are not intended to limit the invention to these embodiments. Based on the described embodiments of the present invention, other embodiments can be obtained by one skilled in the art without creative contribution and are in the scope of legal protection given to the present invention.

Furthermore, all characteristics, measures or processes disclosed in this document, except characteristics and/or processes that are mutually exclusive, can be combined in any manner and in any combination possible. Any characteristic disclosed in the present specification, claims, Abstract and Figures can be replaced by other equivalent characteristics or characteristics with similar objectives, purposes and/or functions, unless specified otherwise.

In the following specification, the invention will be described with reference to specific examples of embodiments of the invention. It will, however, be evident that various modifications and changes may be made therein without departing from the broader spirit and scope of the invention as set forth in the appended claims.

Herein, a "length" of an article, structure, device or feature generally refers to its largest or maximum dimension in a Cartesian coordinate (i.e., three-dimensional) system. Likewise, a "width" generally refers to its second-largest dimension in the Cartesian coordinate system, and a "thickness" generally refers to its smallest or minimum dimension in the Cartesian coordinate (i.e., three-dimensional) system. In addition, the phrases "liquid-phase," "liquid" and the like describe materials that are at least partially in the liquid phase at ambient temperatures (e.g., room temperature, 15-27° C., or any temperature [e.g., 298 K] or temperature range [e.g., 20-25° C.] therein).

The present apparatus/system and method can be applied in the fields of biology, chemistry, materials science and related fields. The device, system and/or apparatus is/are applicable, but not restricted, to cross-sectioning (e.g., of samples containing liquid-phase material[s]) for subsequent imaging and micro-analysis, and extraction of specimens out of samples containing liquid-phase material(s).

Figure 1B:
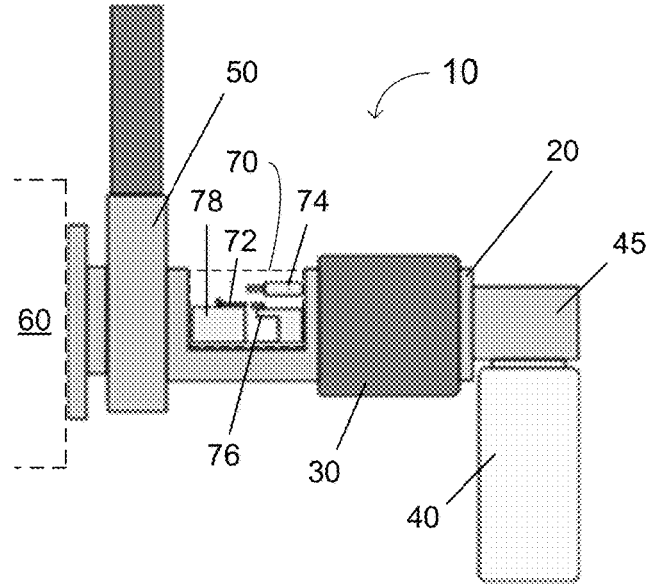
Figure 1C:
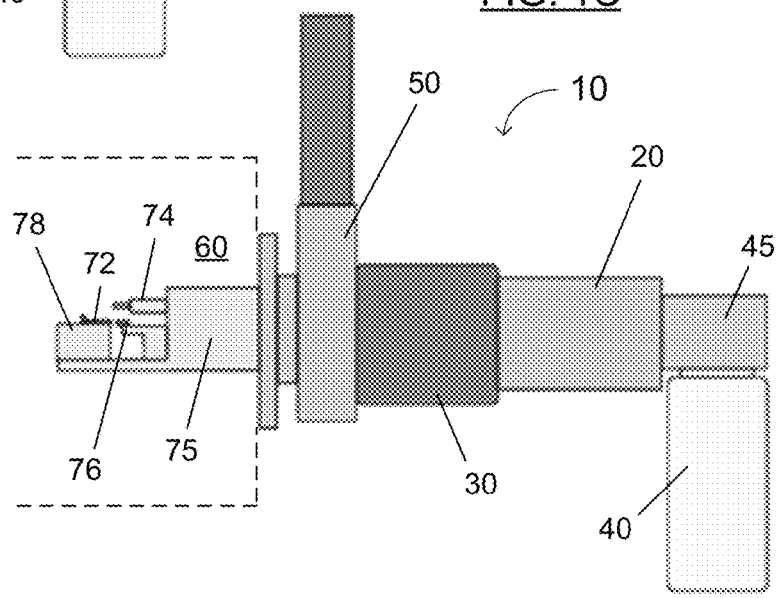

FIGS. 1A-C illustrate a simplified apparatus 10 for cleaving and/or cross-sectioning samples containing liquid-phase material(s). A sample containing liquid-phase material(s) may be referred to herein as a "liquid sample." FIG. 1A is a general view of certain components of the simplified apparatus 10 in an initial or default position or configuration (e.g., a "home" position or configuration), which includes a housing 20 (e.g., for various mechanical and electrical components), a load-lock cover 30 covering a load-lock chamber, a coolant vessel 40, and a cooling transfer section 45. Alternatively, the load-lock cover 30 may be replaced with a door, input/output port or other mechanism for accessing the load lock chamber. A gate valve 50 is between the load-lock chamber and a vacuum chamber 60 (not shown).

Mechanical components in the housing 20 may include one or more extendable rails or a telescopic arm or fork (e.g., to support a platform or substrate for a sample holder, a cleaving knife and a manipulator), one or more motors and/or actuators for the mechanical components, a sample cooling mechanism configured to cool the sample, etc. Electrical components may include a controller or microprocessor configured to control and/or monitor various operations in the apparatus 10, electronics for the motor(s) for the mechanical components, etc. Electromechanical components in the housing 20 may include a mechanism for retracting the load-lock cover 30. The coolant vessel 40 may include a Dewar vessel containing a coolant such as dry ice (and optionally a liquid-phase material such as ethanol or isopropanol), liquid nitrogen or liquid helium, and the cooling transfer section 45 may comprise one or more mechanisms configured to transfer thermal energy from the sample, the sample holder and/or the sample cooling mechanism to the coolant in the coolant vessel 40 or to transport the coolant to the sample, the sample holder and/or the sample cooling mechanism.

FIG. 1B shows the apparatus 10 of FIG. 1A in the loading position or configuration. FIG. 1B shows the cleaving module docked to the vacuum chamber 60. The load-lock cover 30 is retracted over the housing 20, exposing the load-lock chamber 70. The load-lock chamber 70 houses the cleaving module, which includes a sample holder 72, a manipulator 74, a cleaving unit 76, and a chuck 78 configured to secure and release the sample holder 72. The manipulator 74 is configured to manipulate (e.g., grasp, lift, tilt, rotate, etc.) the sample and/or sample holder in as least two (and preferably three) linear directions (e.g., defined by Cartesian coordinates) and in at least one (and preferably at least two) angular directions (e.g., defined by angular coordinates). In one embodiment, the manipulator 74 comprises a manipulating gripper, but the invention is not limited thereto. The cleaving unit may be as described in or substantially as described in U.S. patent application Ser. No. 14/871,668, the relevant portions of which are incorporated herein by reference.

FIG. 1C shows the apparatus 10 of FIGS. 1A-B in the working position or configuration. The load-lock cover 30 is returned to a position over the load-lock chamber 70, and the platform or support 75 for the sample holder 72, manipulator 74, cleaving unit 76 and chuck 78 is extended into the vacuum chamber 60. Typically, prior to extending the platform or support 75 into the vacuum chamber 60 and after the load-lock cover 30 is moved back over the load-lock chamber 70, the load-lock chamber 70 is evacuated (i.e., subjected to vacuum through one or more ports or valves in the gate valve 50) and refilled with an inert gas, such as nitrogen, argon or helium. Accordingly, a vacuum seal may be between the load-lock cover 30 and each of the housing 20 and the gate valve 50. For example, complementary or mating parts of a first vacuum seal may be along the inner surface of the rim, edge or bead of the load-lock cover 30 and the facing surface of a similar rim, edge or bead of the housing 20 at an interface between the load-lock cover 30 and the housing 20, and complementary or mating parts of a second vacuum seal may be along the edge of the load-lock cover 30 at the opposite end thereof and an outer surface of the gate valve 50. Once the platform or support 75 is extended into the vacuum chamber 60, the gate valve 50 can be closed or sealed, the liquid sample can be solidified (e.g., by freezing or cooling to a temperature below the freezing point of the liquid[s] in the sample), and the vacuum chamber 60 can be evacuated prior to cleaving the sample and imaging or otherwise analyzing the cleaved sample.

FIGS. 2A-11 illustrate different stages in the cleaving process.

Figure 2A:
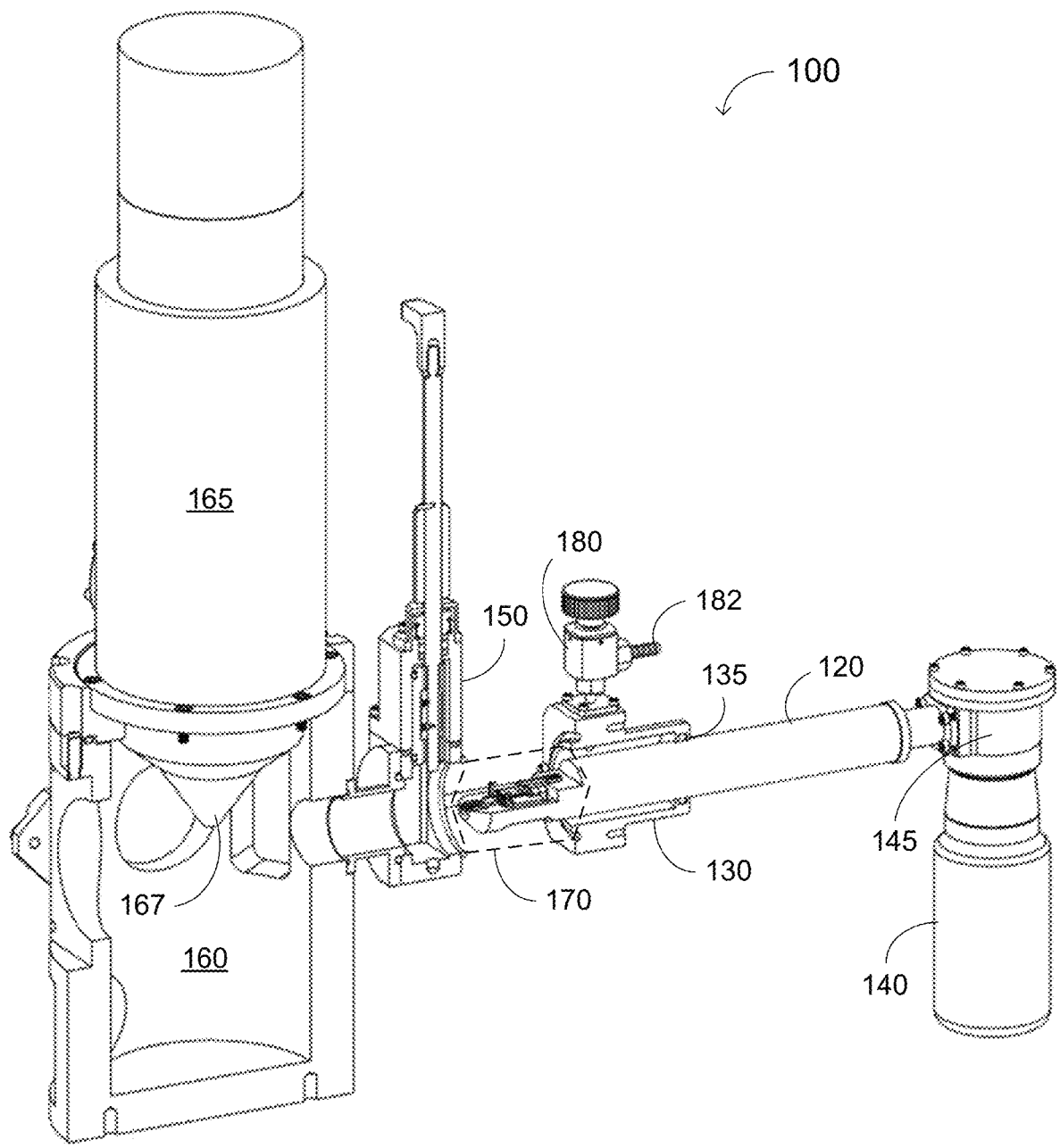

FIG. 2A is a more detailed illustration of an apparatus 100 for cleaving a liquid sample, in a default or loading position or configuration (e.g., a "home" position), including a number of modules to practice a method/process for cleaving liquid samples. The apparatus 100 includes a vacuum chamber 160 with a vacuum system (not shown) operably connected thereto, an imaging device 165 (e.g., an electron microscope, an optical microscope, a scanning probe microscope, a laser scanning microscope, etc., and optionally, a camera or other image-capturing device) with a lens 167 extending into the vacuum chamber 160, a sample loading system 170 (e.g., a load lock chamber, a loading stage similar to the sample holder 72 and platform or support 75, etc.), a cryogenic system (e.g., a Dewar vessel 140 and a cooling transfer device within transfer section 145 and housing or loading arm 120), a sample handling system (e.g., a sample chuck, a sample positioning system similar to manipulator 74, etc.), and a cleaving unit (e.g., including a cleaving knife, a plurality of support, alignment and/or positioning pins, one or more preloading devices, etc.). The gate valve 150 and the vacuum chamber 160 are shown in cross-section. The gate valve 150 is in the closed position in FIGS. 2A-B. The load lock cover 130 is retracted to expose the sample loading system 170 in FIG. 2A.

When the load lock cover 130 is in place over the sample loading system 170 and in contact with the closed gate valve 150 (FIG. 2B), the load lock cover 130 and the gate valve 150 (and, optionally, the housing or loading arm 120) define a load lock chamber. The load lock chamber houses the sample loading system 170. A valve 180 operably connected to the load lock cover 130 includes a nipple 182 to which vacuum tubing (operably connected to a vacuum system) is attached. In one embodiment, the vacuum tubing may also be connected to a three-way valve or equivalent device(s), configured to switchingly connect the valve 180 to either the vacuum system or a source of an inert gas such as nitrogen or argon. The load lock chamber is evacuated by opening the valve 180 when it is operably connected to the vacuum system. Optionally, the load lock chamber can be refilled with the inert gas through the valve 180.

Figure 3:
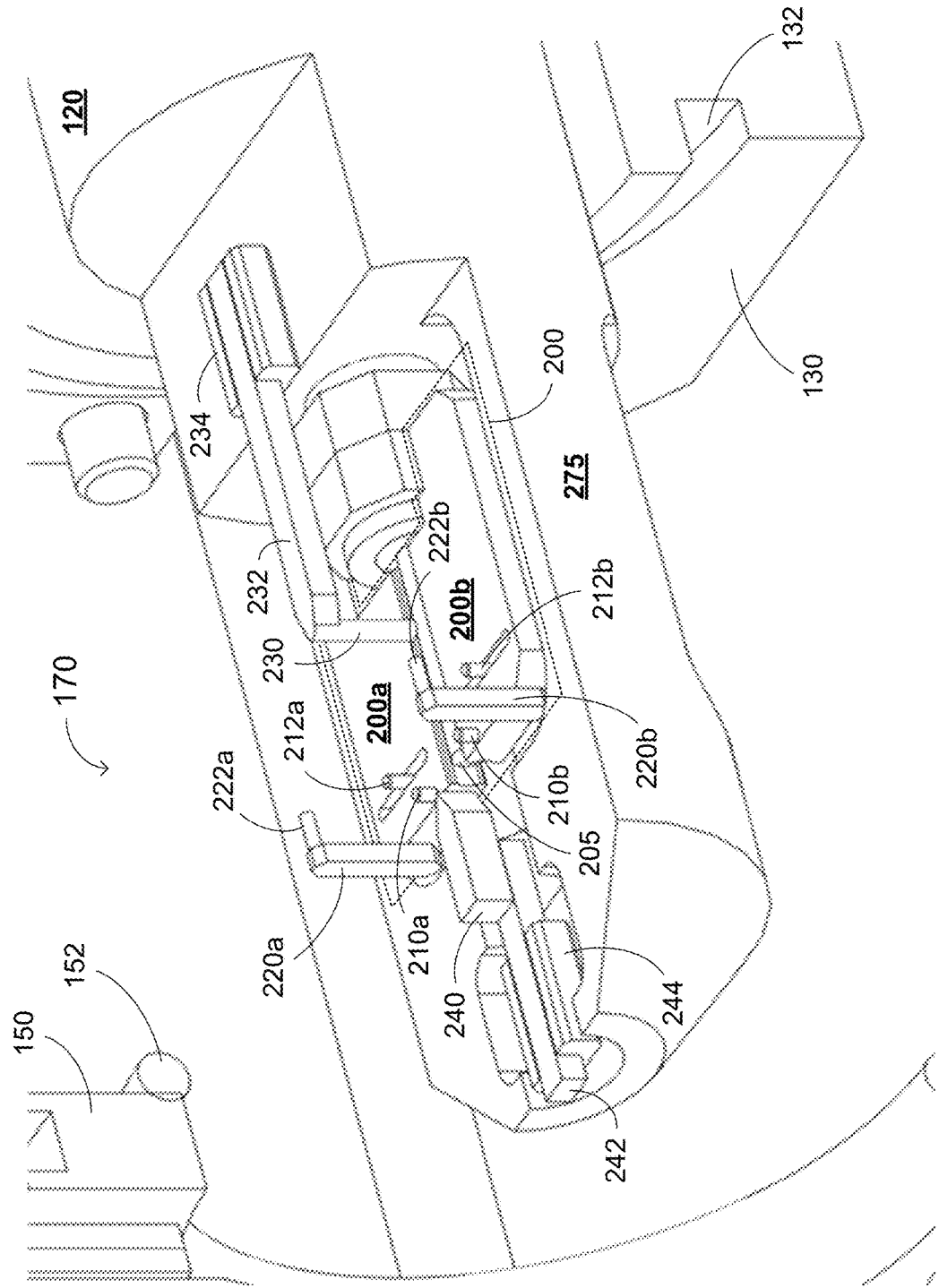

FIG. 3 shows a more detailed view of the sample loading system 170 in the loading position or configuration. The various components of the sample loading system 170 are supported by a loading stage, platform or support 275.

The sample loading system 170 includes a chuck 200, a cylindrical cryo-cooling chuck support pin 205, alignment pins 210a-b, end-effector pins 212a-b, pre-loading clamps 220a-b and pins 222a-b, cleaving support pin 230 and stage 232, and cleaving knife (or nano-indenter) 240 and stage 242. The chuck 200 has two tilting wings or sections 200a-b, each operably connected to and configured to rotate (in opposite directions) around the cryo-cooler/support pin 205. A sample holder (described below) is placed on the chuck 200. The pins 210a-b and 212a-b hold the sample holder in place. The clamps 220a-b rotate (or are mechanically lowered and raised) to hold the sample holder firmly in place on the chuck 200a-b using the pins or bars 222a-b. The pin 230 is above the cylinder 205 and is moved along the long/axis direction of the cryo-cooler/support pin 205 by the stage (e.g., an actuator bar) 232 to provide an opposing force to the cleaving knife 240 when the sample is cleaved. A guide 234 for the stage 232 ensures correct positioning of the pin 230. An actuator and/or motor for the stage 232 is not shown, but may be within the housing 120. The cleaving knife 240 has a tip between the pre-loading clamps 220a-b and is moved toward the sample holder by the stage (e.g., an actuator bar) 242, which is guided by a guide 244. The tip of the cleaving knife 240 and the stage 242 are aligned with the pin 230 by the guide 244.

The load lock cover 130 is retracted along the housing 120, revealing a groove 132 configured to receive a sealing ring 152 on the outer surface of the gate valve 150 and form a vacuum seal between the load lock cover 130 and the gate valve 150. A silicone or other rubber gasket and optionally a sealant (e.g., silicone grease or lubricant) may be placed in the groove 132 in accordance with techniques known in the art. The load lock cover 130 also has a vacuum sealing ring 135 (FIGS. 2A-B) configured or adapted to form a vacuum seal around the housing or loading arm 120, adapted to allow the load lock cover 130 to slide along the housing or loading arm 120 and/or through which the housing or loading arm 120 may slide.

Figure 4:
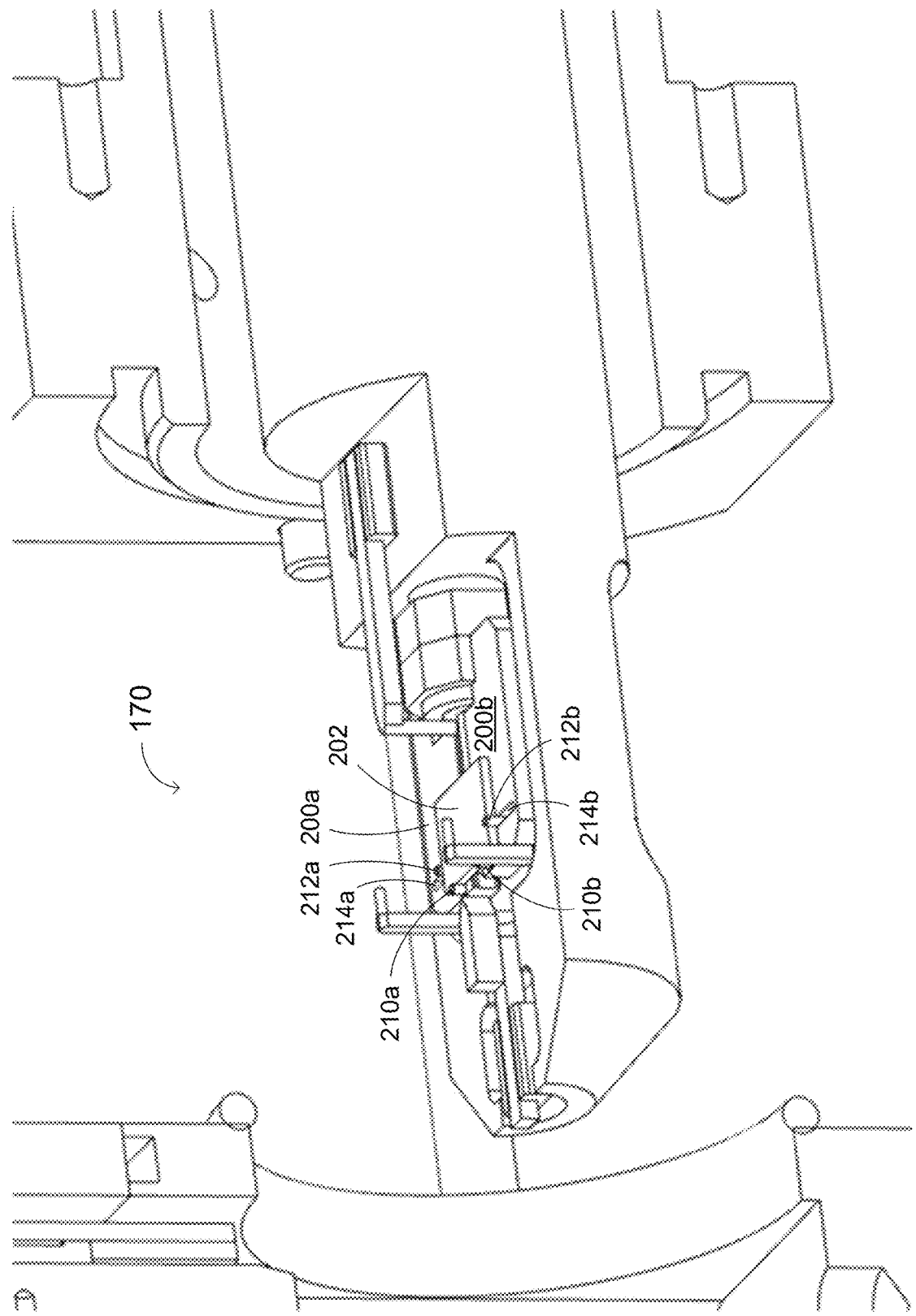

FIG. 4 shows the sample loading system 170 with the sample holder 202 placed on the chuck 200. The sample holder 202 is placed on the stage sections 200a-b manually or using a manipulator (not shown) similar to manipulator 74 in FIG. 1. The sample holder 202 may be selected and/or surface-treated so that the sample binds to it. Generally, one edge or end of the sample holder 202 is placed against the alignment pins 210a-b when the effector pins 212a-b are separated by a distance greater than the width of the sample holder 202 (or its length, as the case may be, depending on its orientation). The effector pins 212a-b are then moved in the slots 214a-b toward the sample holder 202 (e.g., by one or more motors, actuators, rotors and linear gears, etc.) until the effector pins 212a-b contact the sides of the sample holder 202.

FIG. 5A shows the sample loading system 170 with the sample holder 202 clamped in place on the chuck sections 200*a-b*. After the effector pins 212*a-b* contact the sample holder 202, the clamp arms 220*a-b* rotate towards the upper surface of the sample holder 202 until the pre-loading pins 222*a-b* contact the sample holder 202. In some embodiments, this may result in application of a three-point bending moment to the crystalline sample holder 202 (e.g., when the chuck sections 200*a-b* are rotated or otherwise moved away from the sample holder 202, and the sample holder 202 contacts or rests on the cryo-cooling support pin 205). After the pre-loading pins 222*a-b* contact the sample holder 202, the cleavage support stage 242 moves the cleavage support pin 230 towards the sample holder 202 until the cleavage support pin 230 contacts the sample holder 202. There is typically some space between the cleavage support pin 230 and the chuck 200 (e.g., 0.1-5 mm, or any value or rang of values therein), although in embodiments in which the spacing between the two chuck sections 200*a-b* is greater than the width, thickness or diameter of the cleavage support pin 230, the same spacing may exist between the cleavage support pin 230 and the cryo-cooling support pin 205. The liquid sample may be placed on or in the sample holder 202 at any time during the process(es) described with respect to FIG. 5A or immediately thereafter.

Figure 5B:
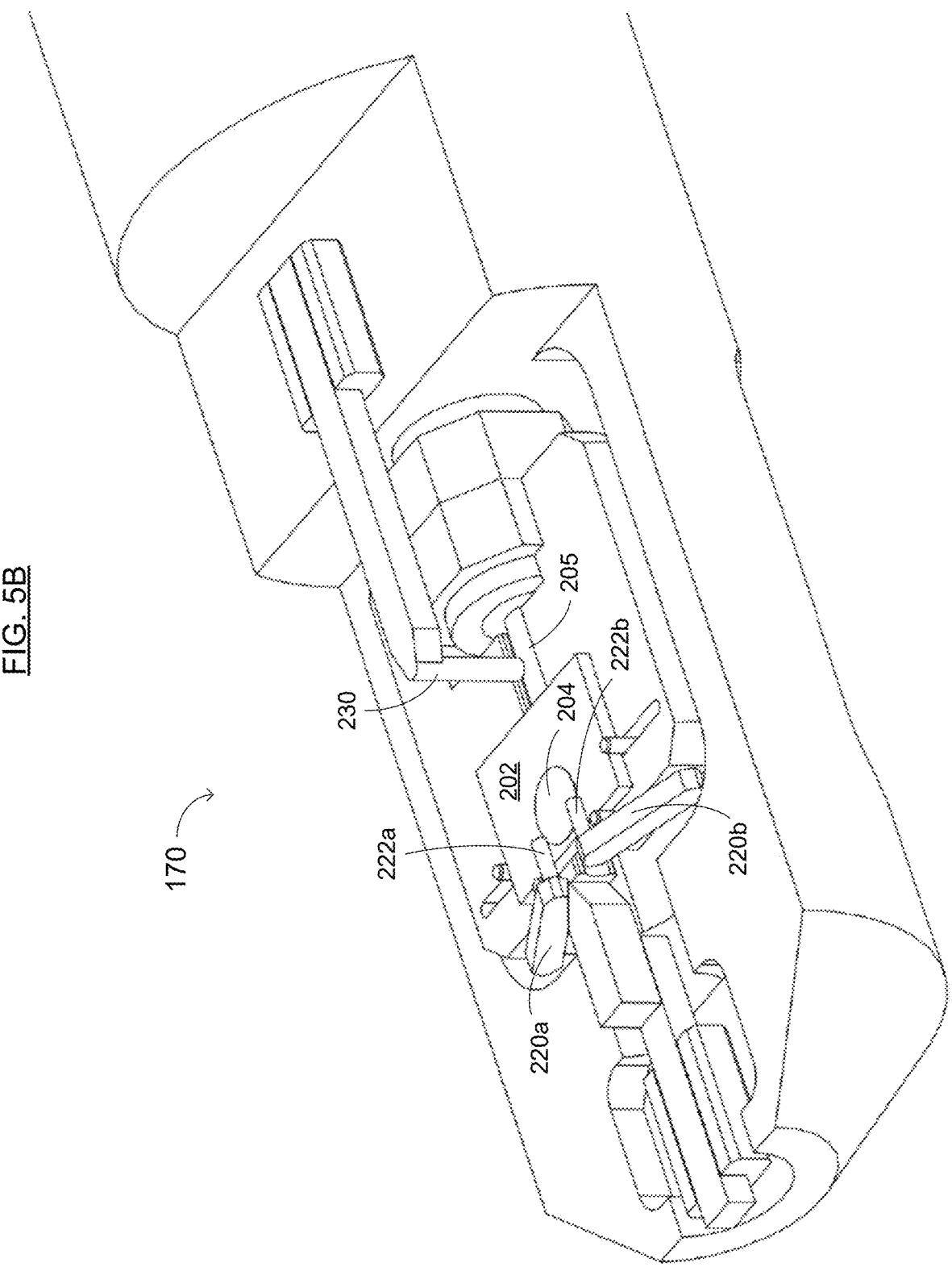

For example, FIG. 5B shows a liquid-phase sample 204 on the sample holder 202 prior to the cleavage support pin 230 contacting the edge of the sample holder 202. The sample 204 may be in a well or depression in the sample holder 202. The samples to be solidified (or frozen) and cleaved may comprise a fluid such as, e.g., water (saline, biological fluids, aqueous suspensions of particles, emulsions, etc.), organic solvents and mixtures (e.g., solutions or suspensions of polymers or nanoparticles in an organic solvent or mixture of organic solvents), liquid crystals, nanofluids, ferrofluids, etc. The sample 204 may be physically adhered to the sample holder 202 by freezing the sample 204 or otherwise converting a liquid-phase material in the sample 204 at the interface with the sample holder 202 to the solid phase. Alternatively or additionally, the sample 204 may be chemically adhered to or encapsulated on the sample holder 202. For example, a single-crystalline silicon sample holder can be coated with a conventional silazane to chemically bind a water-based or water-containing sample. Alternatively, prior to solidification, the sample can be encapsulated with a thin plastic sheet or film that is relatively flexible at ambient temperatures, but relatively fracturable at the sample solidification temperature.

The sample (e.g., a fluid droplet) 204 on the sample holder or substrate 202 is cooled (e.g., frozen or solidified) using the cryo-cooling support pin 205, which also functions as a cryo-stage to freeze or solidify the sample 204. Alternatively, the sample 204 may be frozen or solidified on the sample holder 202 externally (e.g., in a freezer), prior to placement on the chuck 200. For example, the sample 204 (e.g., of a biological fluid) may be flash-frozen on the sample holder 202 using liquid nitrogen or a liquid nitrogen slush, and after placement on the chuck 200, the cryo-cooling support pin 205 can be used to maintain the sample 204 in the frozen or solid state (e.g., at a predetermined temperature, such as −20° C., −40° C., −78° C., −196° C., etc.). In embodiments in which the chuck sections 200*a-b* are not rotated or moved away from the sample holder 202, the chuck sections 200*a-b* may be made of or comprise (at least on the uppermost surface) a thermally conductive material, such as a metal or metal alloy.

Figure 6A:
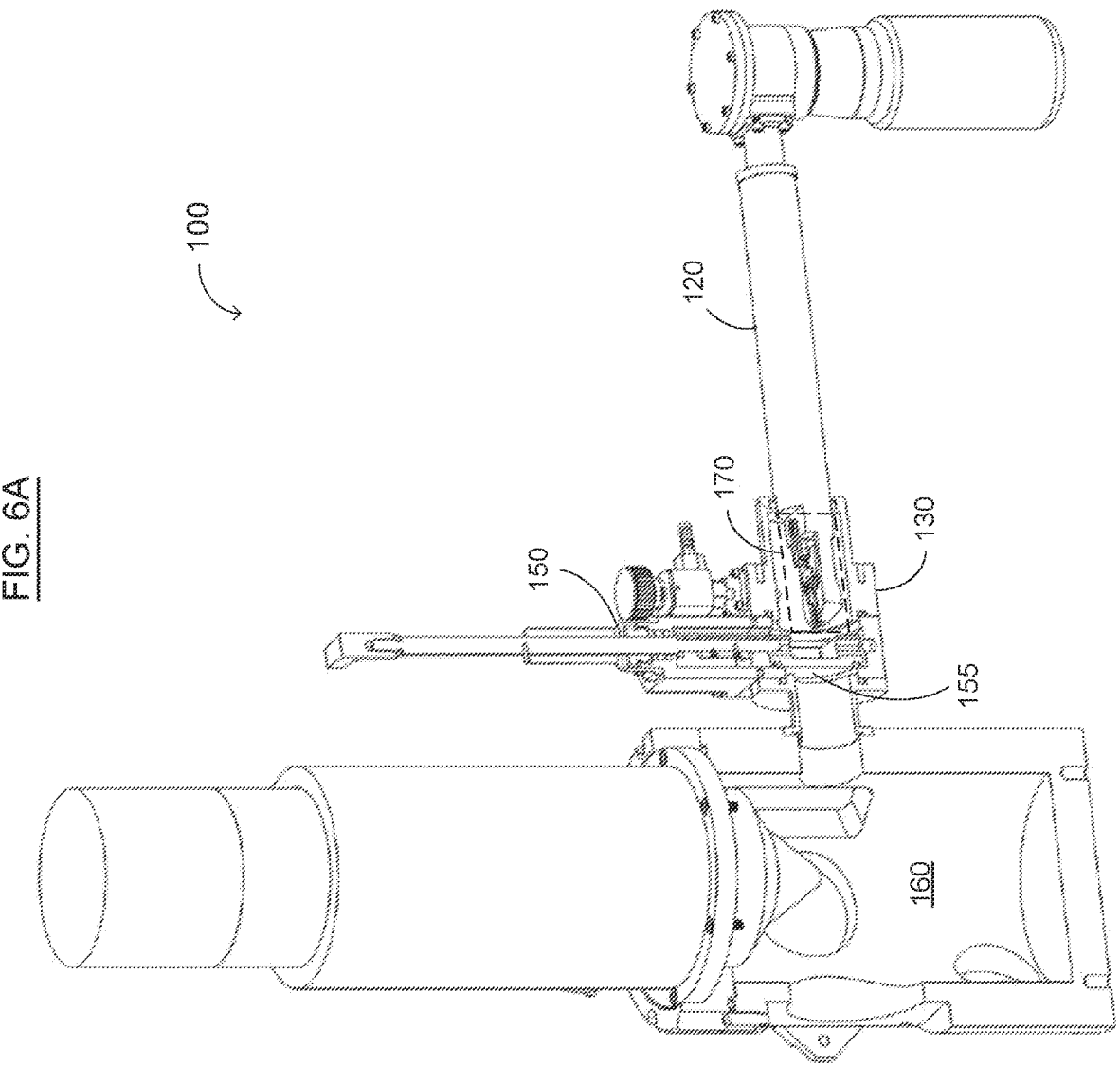

FIG. 6A shows the sample loading system 170 in the lock load chamber with the lock load cover 130 in place against the gate valve 150, after evacuation of the lock load chamber and freezing or solidification of the sample 204. The gate valve 150 is in the closed position. When the pressure in the lock load chamber is equal to the pressure in the vacuum chamber 160 (e.g., by opening a valve or other gas port in the gate valve 150), the gate valve 150 may be opened, and the sample loading system 170 with the solidified sample thereon inserted into the vacuum chamber 160.

FIG. 6B shows the sample loading system 170 inserted into the vacuum chamber 160. After the sample is placed on the sample holder, the load lock cover 130 is returned to its default position in contact with the gate valve 150 (i.e., over the sample loading system 170), and the sample 204 may be frozen or solidified (e.g., by cooling below the melting point of any liquids in the sample 204). The load lock chamber is then evacuated by opening the valve 180. Optionally, the load lock chamber is refilled with an inert gas. Alternatively, the load lock chamber may be evacuated indirectly by a vacuum system operably connected to the vacuum chamber 160, (e.g., by opening a valve or other port in the gate valve 150 between the vacuum chamber 160 and the load lock chamber, and evacuating the vacuum chamber 160 using the vacuum system).

After the load lock chamber and the vacuum chamber 160 are evacuated and optionally refilled with inert gas (e.g., two or more times), a gate 155 (FIG. 6A) in the gate valve 150 is opened, the sample loading system 170 is inserted through an opening in the gate valve 150 having dimensions (e.g., a diameter) matching those of the housing 120 into the vacuum chamber 160. In one embodiment, the gate 155 opens and closes the opening in the gate valve 150. In other or further embodiments, the sample loading system 170, the housing 120, the coolant vessel 140 and cooling transfer section 145 are moved together as a unit when the housing is inserted through the opening in the gate valve 150. The opening in the gate valve 150 may have a vacuum seal through which the housing slides, similar to the vacuum sealing ring 135 in FIGS. 2A-B.

Figure 7:
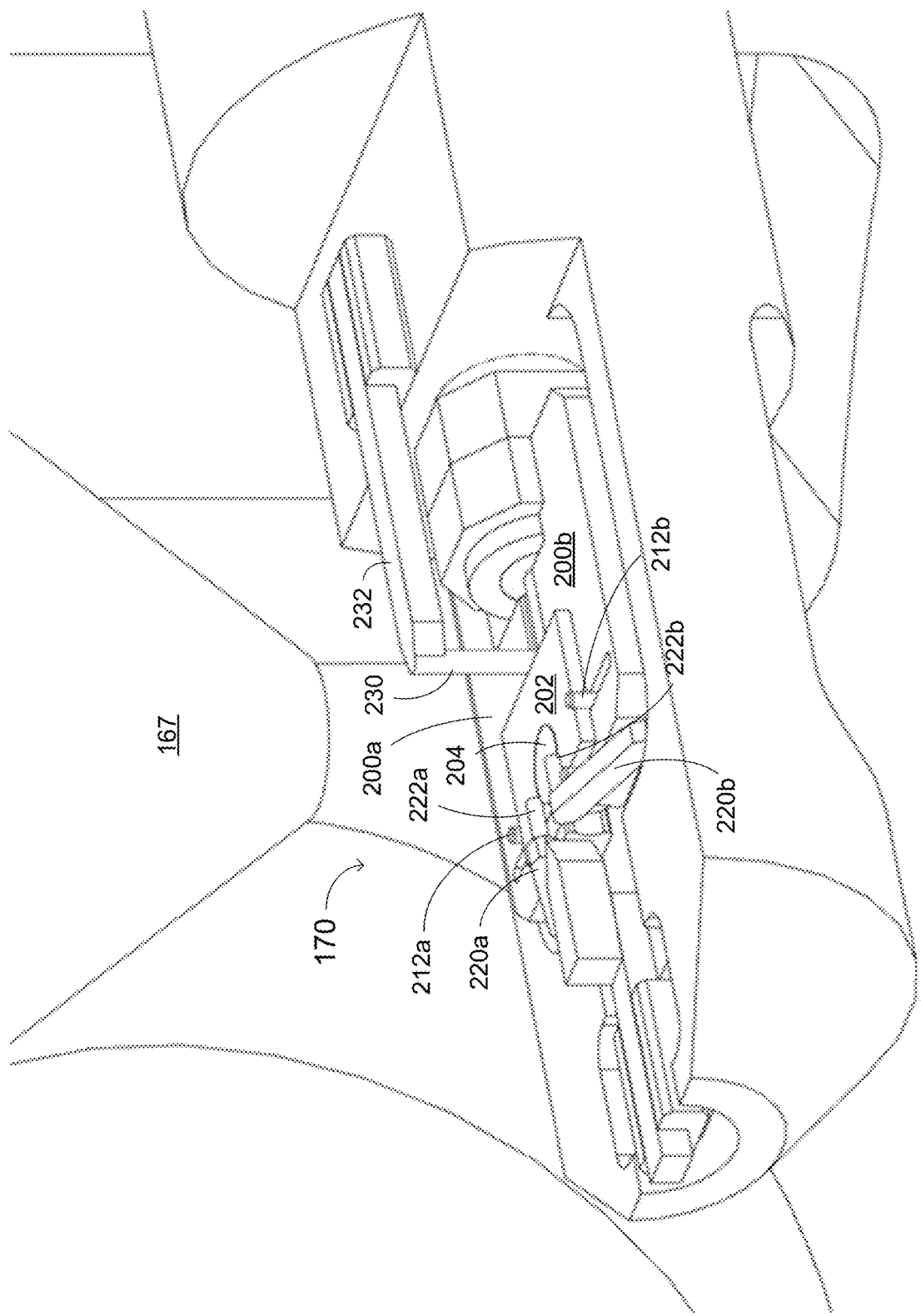

FIG. 7 is a close-up, perspective view of the sample loading system 170 in the vacuum chamber 160, under the lens 167 of an imaging device 165 (FIGS. 2A-B). In FIG. 7, the solidified liquid sample 204 is on the sample holder 202, which is held in place by the end pins 210*a-b* (not readily visible), effector pins 212*a-b*, cleavage support pin 230 and clamps 220*a-b*. Alignment of the sample 204 and/or sample holder 202 in the vacuum chamber 160 is carried out utilizing the imaging device 165. In one embodiment, the imaging device 165 is a scanning electron microscope (SEM). In other embodiments, the imaging device 165 is an optical microscope, but the invention is not limited thereto.

Figure 8A:
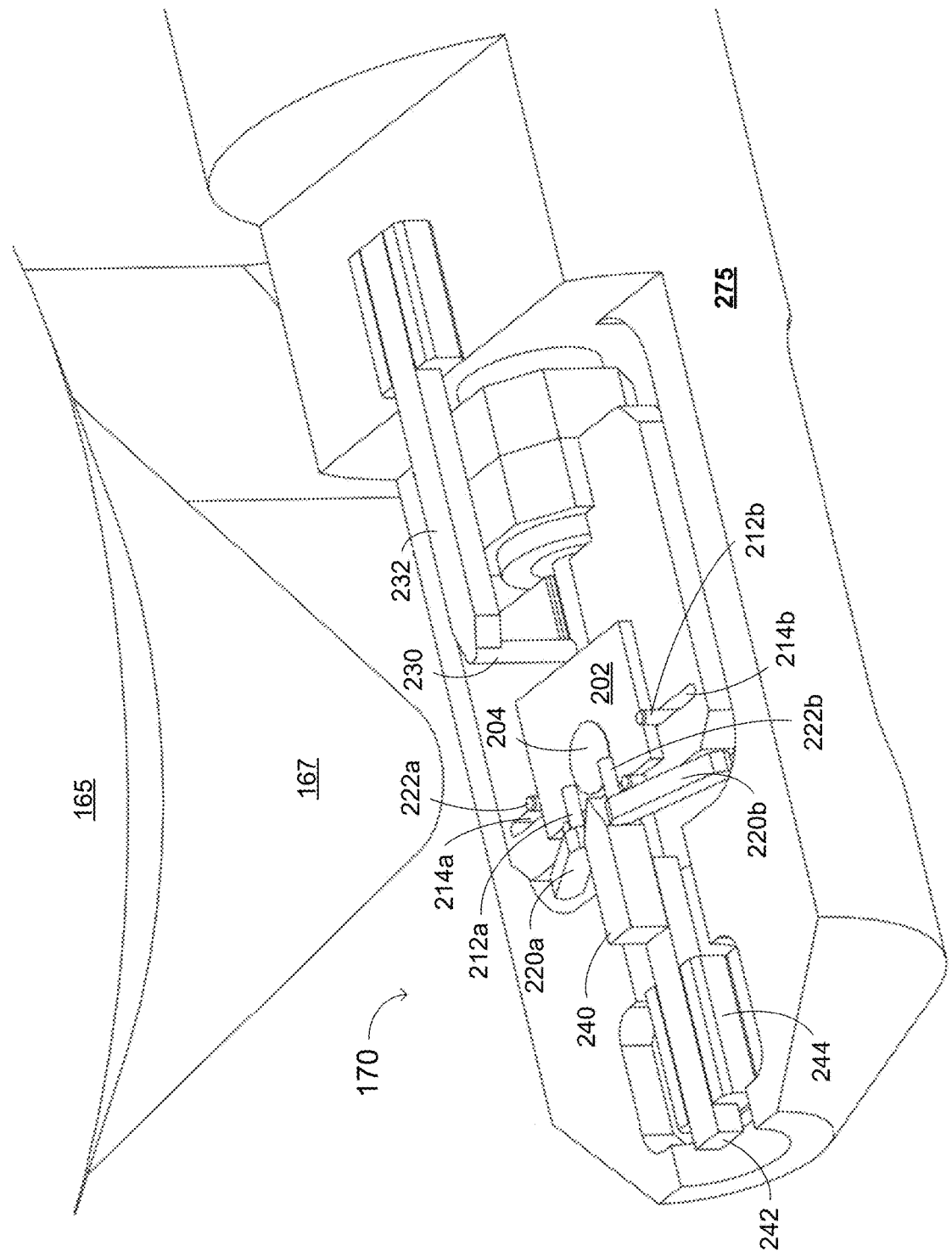

FIG. 8A shows the sample loading system 170 with the sample 204 under the lens 167 of the imaging device 165, after alignment of the sample 204 and/or the sample holder 202. The sample holder 202 may be moved longitudinally (i.e., along an axis defined by the stages 232 and 242) by adjusting the position of the sample loading stage, platform or support 275. In various embodiments, the sample holder 202 may be moved laterally (i.e., along an axis defined by the slots 214*a-b*) by adjusting the positions of the effector pins 212*a-b* in the slots 214*a-b*. The tip of the cleaving knife 240 is then brought into position adjacent to the sample holder 202 using the cleaving knife stage 242 when the area of interest in the sample 204 is aligned with the tip of the cleaving knife 240. The operations described with respect to FIG. 8A can be monitored using the imaging device 165.

Figure 8B:
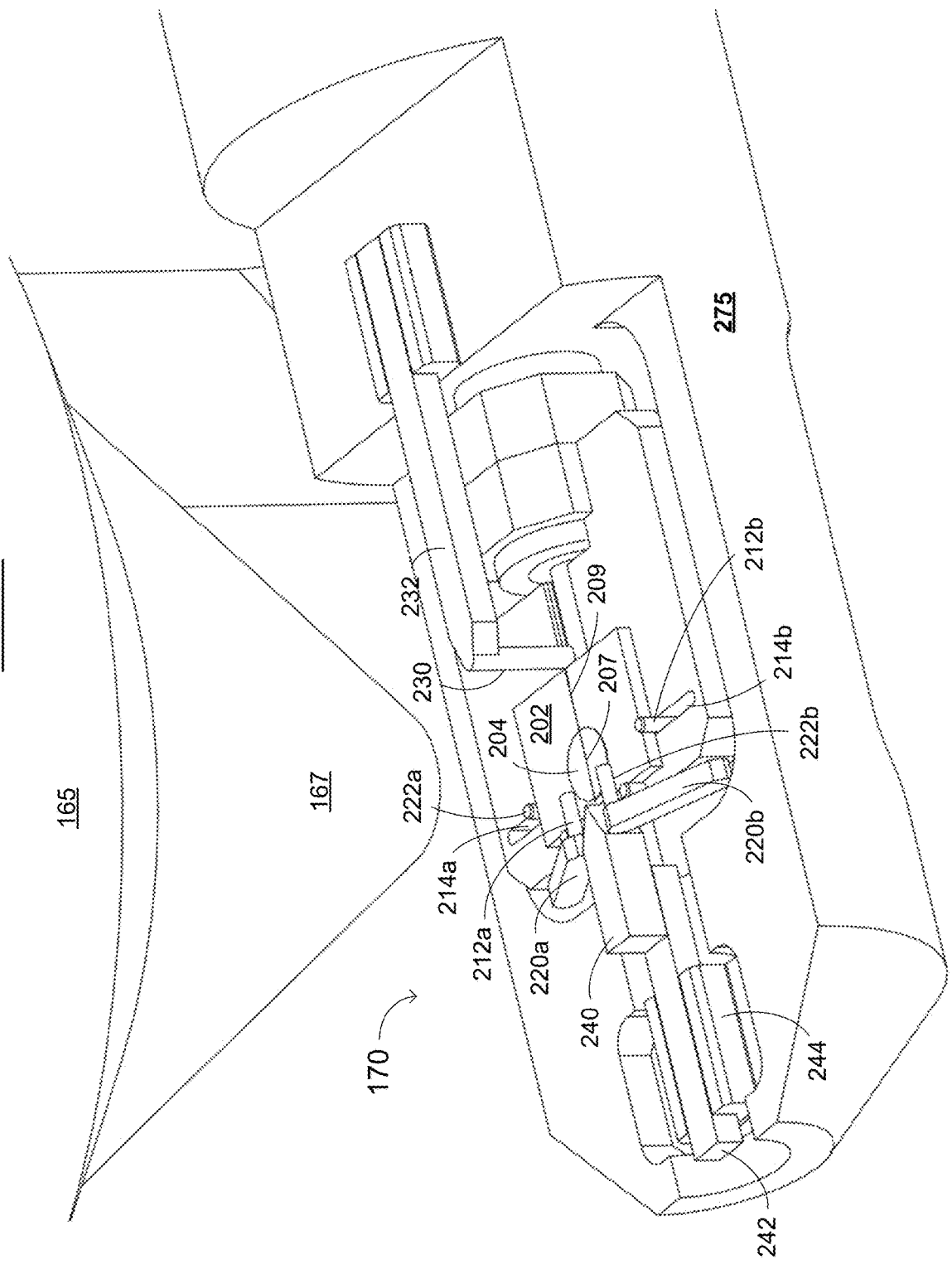

FIG. 8B shows the sample loading system 170 with the sample 204 under the lens 167 of the imaging device 165, after cleavage of the sample 204 and sample holder 202. One or both of the cross-sectioned and/or cleaved sample sections 204a-b may be observed, for example, by making an image of the cleaved sample using a camera and a microscope (e.g., imaging device 165) or other magnifying and/or focusing lens 167. Because it comprises, consists essentially of or consists of a crystalline (e.g., single crystal) material, the sample holder 202 initiates cleavage of the solid sample 204 in the area of interest 207 along the cleave line 209 in the sample holder 202. In other words, the crack or cleft formed in the sample holder 202 propagates through the solidified or frozen sample 204 (e.g., when the sample binds sufficiently well to the substrate). Cleavage of the sample holder 202 along the cleave line 209 (and thus of the sample 204 in the area of interest 207) is effected by indenting the sample holder 202 with the cleaving knife 240 until the cleave line 209 appears. Cleavage of the sample holder 202 and sample 204 may occur soon after the tip of the cleaving knife 240 contacts the sample holder 202, particularly when a three-point bending moment is applied to the sample holder 202. The cleavage operation is typically conducted in a vacuum (e.g., ≤1 torr, ≤0.1 torr, ≤1 mtorr, or any other maximum value <1 torr), and can be monitored using the imaging device 165.

Figure 9:
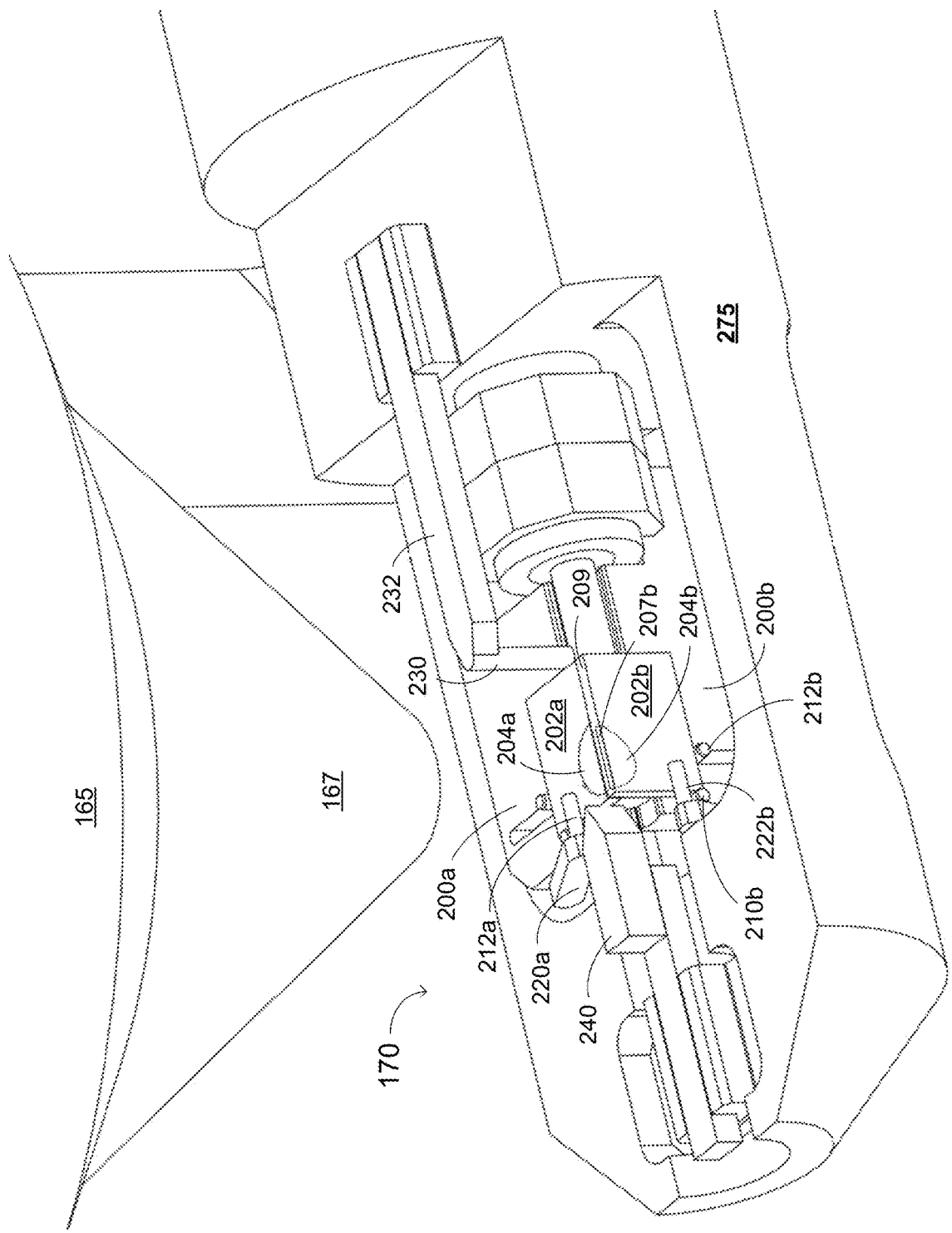

FIG. 9 shows the cleaved sample 204a-b and sample holder 202a-b, with the front chuck section 200b rotated away from the lens 167 (e.g., by 90°). By so rotating the cleaved sample holder section 202b and sample section 204b, the imaging device 167 can image objects, structures, surfaces, etc. on or in the area of interest 207b in the sample section 204b. The cleaved sample holder section 202b is held in place on the front chuck section 200b by pins 210b, 212b and 222b. Optionally, the cleaved sample holder section 202b may be held in place on the front chuck section 200b by physical and/or chemical adhesion, as described herein.

Figure 10:
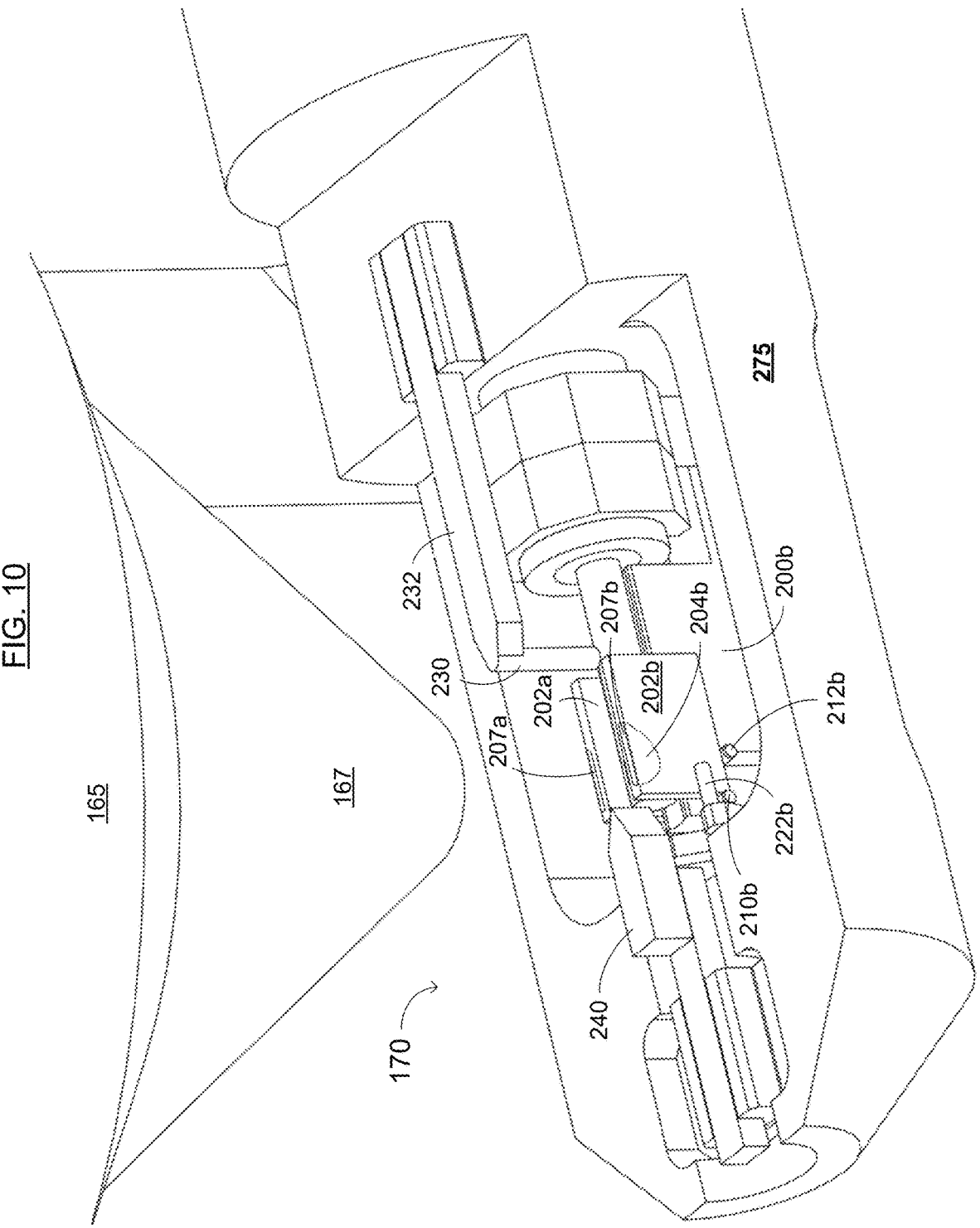

FIG. 10 shows the cleaved sample 204a-b and sample holder 202a-b, with the two chuck sections 200a-b both rotated away from the lens 167 (e.g., by 90°). By so rotating the cleaved sample holder section 202a and sample section 204a, the imaging device 167 can image objects, structures, surfaces, etc. on or in the area of interest 207a in the sample section 204a (not shown in FIG. 10). For biological samples, the surface of the area of interest 207a is generally complementary to the area of interest 207b. The cleaved sample holder section 202a is held in place on the chuck section 200a by pins 210a, 212a and 222a (not shown in FIG. 10). Optionally, the cleaved sample holder section 202a may be held in place on the chuck section 200a by physical and/or chemical adhesion, as described herein.

The applications to be performed or conducted using the present cleaving apparatus may include (1) cross-sectioning of soft materials, biomaterials (e.g., biological fluids and tissues), and micro- or nano-structures having a liquid or soft phase (e.g., coatings, flexible and/or printed electronics, thin film batteries, etc.), (2) physical failure analysis, and (3) direct measurement of contact angles between liquids and solid (and optionally treated) surfaces. Advantages of the present apparatus and method include nanoprecision target navigation, real-time controlled cleavage monitored by microscope, and/or reduced artifacts in the solidified, cleaved or cross-sectioned sample (for example, due to the non-contact cleavage of the sample). The present apparatus can be integrated with or into existing scanning electron microscopes (SEMs), focused ion beam (FIB) systems and equipment, and other high resolution imaging equipment, including scanning probe microscopes (SPM). In some cases, one or more pieces of the cleaved substrate can be rotated (e.g., by 90°, in-plane or out-of-plane), and the sample can be cleaved again.

Figure 11:
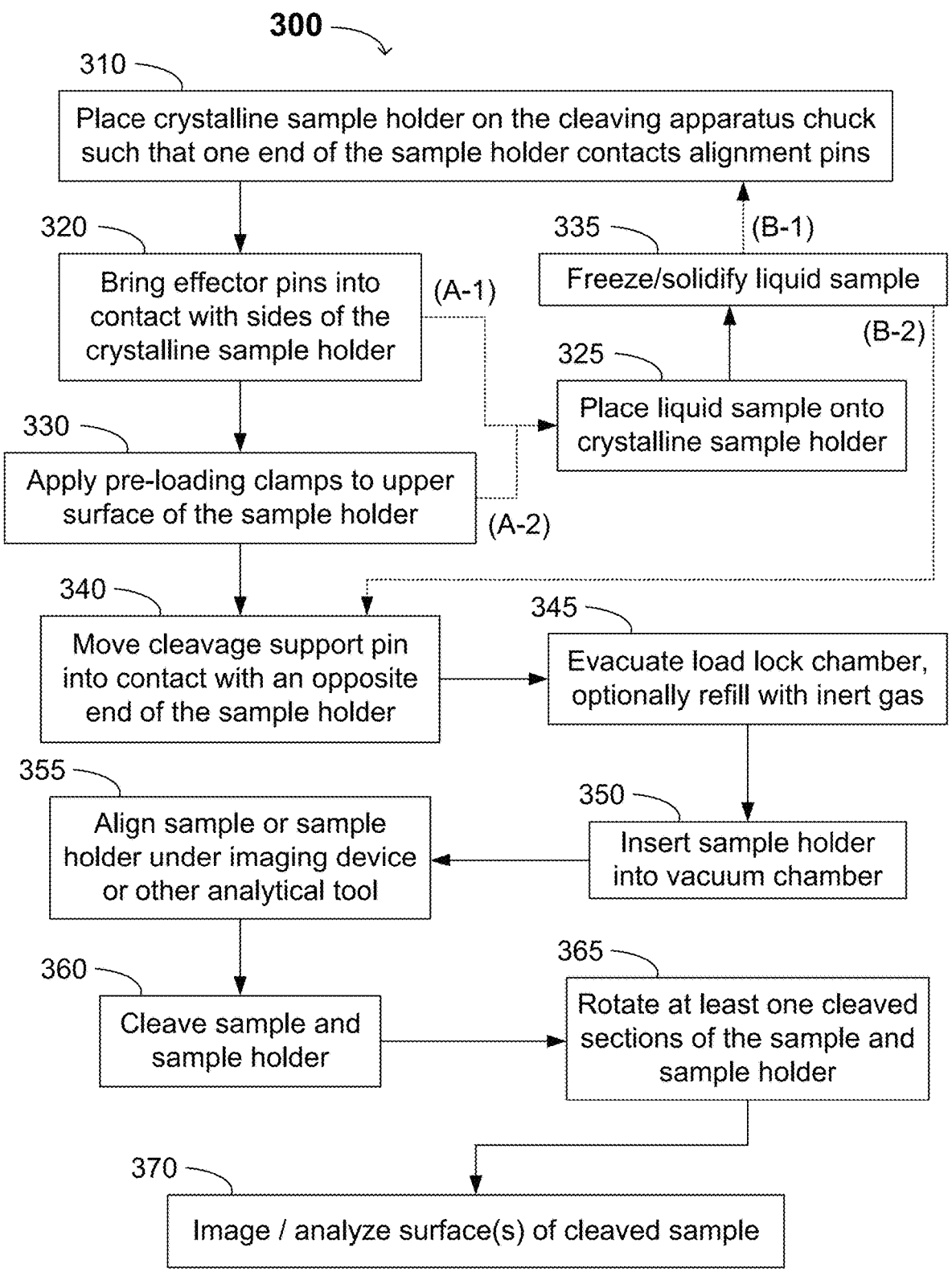
FIG. 11 illustrates an exemplary method according to one or more embodiments of the invention.

FIG. 11 is a flow chart 300 for an exemplary method of cleaving a liquid sample using the present cleaving apparatus. At 310, the method may start by placing a crystalline sample holder as disclosed herein on the chuck of the cleaving apparatus such that one end of the sample holder contacts alignment pins on the chuck (see, e.g., FIG. 3 and the description thereof above). At 320, effector pins are brought into contact with sides of the crystalline sample holder. For example, the effector pins may be located in corresponding slots on opposed sides of the sample holder, spaced apart by a distance greater than the width or length of the sample holder, as described above. After the sample holder is placed between the effector pins, the effector pins are moved towards the sample holder until the effector pins contact the sides of the sample holder. At 330, pre-loading clamps are applied to the upper surface of the sample holder, as described above.

After either 320 or 330, a liquid sample is placed onto the crystalline sample holder at 325 (path A-1 or A-2). As described above, the sample holder may contain a well or depression configured to receive and hold the liquid sample. The liquid sample is then frozen or otherwise solidified at 335. In the flow described so far, the liquid sample may be frozen or solidified using a cryo-cooler as described herein. Alternatively, the method 300 may start at 325 with placing the liquid sample onto the crystalline sample holder, freezing or solidifying the liquid sample at 335 (e.g., using an external cooler or cooling system, such as a freezer or a liquid nitrogen-based cooling system), then placing the sample holder with the frozen/solidified sample thereon on the chuck of the cleaving apparatus at 310 (path B-1). In such a case, the cryo-cooler in the present cleaving apparatus can be used to maintain the temperature of the sample holder and keep the sample in the solid state during the remainder of the method.

In any case, after either 330 or 335 (depending on the starting point and/or the path[s] taken earlier in the method), at 340, a cleavage support pin is into contact with an end of the sample holder opposite from the end in contact with the alignment pins, as described herein. Before, during or after 340 (e.g., after 340), the load lock cover is closed, the load lock chamber is evacuated, and optionally, the load lock chamber is refilled with an inert gas at 345, as described herein. Thereafter, when the pressures in the load lock chamber and the vacuum chamber are equalized, a gate valve in the apparatus in opened, and the sample holder is inserted into the vacuum chamber. For purposes of avoiding damage to the apparatus, the pressures in the load lock chamber and the vacuum chamber are equalized by filling both chambers with the inert gas (e.g., at a pressure of 1 atm or about 1 atm) prior to opening the gate valve and inserting the sample holder (along with the sample loading system, and optionally, part of the housing for the electronics and mechanical devices that perform operations using the sample loading system), but the cleavage and analytical operations on the sample are generally conducted in a vacuum, as described herein. In embodiments in which the load lock chamber and the vacuum chamber are evacuated at the same time using a single vacuum system, the pressures in the chambers may be equilibrated simply by waiting for at least a predetermined period of time (e.g., 1 minute, 3 minutes, 5 minutes, etc.).

Before, during or after evacuation of the vacuum chamber, at 355, the sample or sample holder is aligned under an imaging device (e.g., microscope and camera) or other analytical tool (e.g., a spectrometer) in the apparatus. For example, the sample holder may have one or more alignment marks thereon (e.g., to indicate an alignment position with one or more alignment pins). Alternatively, the imaging device or analytical tool can be used to identify and focus on a region or structure of interest in the sample. In so doing, the position(s) of the sample holder and/or chuck may be adjusted as described herein.

When the sample is in the desired and/or predetermined position, and the vacuum chamber is evacuated the sample holder and sample may be cleaved at 355 as described herein. In various embodiments, a cleaving knife in the apparatus indents the sample holder to initiate a cleavage line or crack in the sample holder. Typically, the cleavage line or crack in the sample holder propagates through the entire sample holder and into the sample, where the cleavage line or crack in the sample holder controls the location and often the angle of the cleavage line or crack in the sample. A certain level of adhesion between the sample holder and the sample can ensure complete, controlled cleavage of the sample along the cleavage line initiated in the sample holder.

Optionally, at 365, at least one cleaved section of the sample holder and sample may be rotated for observation, analysis, and optionally, further cleaving. In various embodiments, the cleaved section of the sample holder and sample may be rotated by 15-135° (or any angle or range of angels therein, such as 60-120°, 90° or about 90°, etc.). In further embodiments, the cleaved sample surface may be further processed (e.g., by etching, milling [for example, focused ion beam milling, broad ion beam milling or polishing, etc.], shadow and/or contrast etching, dyeing or other processing, etc.). At 370, the surface(s) of the cleaved sample are imaged and/or analyzed using the imaging device (e.g., an optical microscope, scanning electron microscope, tunneling electron microscope, etc.) and/or other analytical equipment (e.g., a spectrometer, such as an atomic emission spectrometer, a fluorescence detector, a reflection-based infrared, visible or ultraviolet light spectrometer, etc.). Optionally, the cleaved sample and sample holder may be repositioned (e.g., moved laterally a predetermined distance or rotated in-plane [e.g., around an axis normal to the upper and lower surfaces of the sample and sample holder] by an angle such as 90°) and cleaved a second or further time.

Those skilled in the art will recognize that boundaries between the above described operations and functionalities are merely illustrative. Multiple operations or functionalities may be combined into a single operation or device element, and/or a single operation or functionality may be distributed among plural operations or device elements. Moreover, alternative embodiments may include multiple instances of a particular operation, and the order of operations may be altered in various other embodiments.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediary components. Likewise, any two components so associated can also be viewed as being "operably connected," or "operably coupled," to each other to achieve the desired functionality.

However, other modifications, variations, and alternatives are also possible. The specifications and drawings are, accordingly, to be regarded in an illustrative rather than in a restrictive sense.

The word "comprising" does not exclude the presence of other elements or steps then those listed in a claim. It is understood that the terms so used are interchangeable under appropriate circumstances such that the embodiments of the invention described herein are, for example, capable of operation in orientations or configurations other than those illustrated or otherwise described herein.

Furthermore, the terms "a" or "an," as used herein, generally refer to one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of a definite article. Unless stated otherwise, terms such as "first" and "second" are used to arbitrarily distinguish between the elements such terms describe.

Thus, these terms are not necessarily intended to indicate temporal or other prioritization of such elements. The mere fact that certain measures are recited in mutually different claims does not indicate that a combination of these measures cannot be used to advantage.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. In the drawings and specification, there have been disclosed various embodiments and examples of the invention and, although specific terms are employed, they are used in a generic and descriptive sense only and not for the purpose of limitation. The embodiments were chosen and described in order to best explain the principles of the invention and its practical application. It is intended that the scope of the invention be defined by the claims appended hereto and their equivalents.

What is claimed is:

1. An apparatus for cleaving a sample, comprising:
    a load lock chamber containing a cleaving module, the cleaving module being configured to cleave a sample holder and the sample, the cleaving module comprising a chuck configured to contact a first surface of the sample holder and secure and release the sample holder, wherein the sample (i) includes one or more materials that are in a liquid phase at ambient temperatures and (ii) is cleavable by the cleaving module when in a solid phase on or in the sample holder, and the sample holder is crystalline;
    a cryo-cooler operably connected to the cleaving module and configured to cool and/or maintain a temperature of the sample holder and the sample below a melting point of each of the one or more materials that are in the liquid phase at ambient temperatures;
    a vacuum chamber configured to receive the cleaving module from the load lock chamber; and
    a gate valve between the load lock chamber and the vacuum chamber, the gate valve having at least one opening therein configured to (i) allow the cleaving module to enter and exit the vacuum chamber and/or (ii) permit gaseous communication between the load lock chamber and the vacuum chamber.

2. The apparatus of claim 1, wherein the cleaving module further comprises a cryo-cooling support device configured to cool the sample holder directly or indirectly, a cleaving knife configured to initiate a cleavage line in the sample holder at one end of the sample holder, and a cleavage support pin configured to contact an opposite end of the sample holder.

3. The apparatus of claim 2, wherein the cleaving module further comprises a plurality of alignment pins configured to contact the one end of the sample holder, a plurality of effector pins configured to contact opposed sides of the sample holder, and a plurality of clamps configured to contact a surface of the sample holder opposite or away from the chuck.

4. The apparatus of claim 3, further comprising electronics and/or motors configured to move (i) the plurality of effector pins towards and away from the opposed sides of the sample holder and (ii) the plurality of clamps towards and away from the surface of the sample holder.

5. The apparatus of claim 2, wherein the cleaving module further comprises (i) a cleaving knife stage configured to move the cleaving knife towards and away from the one end of the sample holder and (ii) a cleavage support stage configured to move the cleavage support pin towards and away from the opposite end of the sample holder.

6. The apparatus of claim 5, further comprising electronics and/or motors configured to move (i) the cleaving module into and out of the vacuum chamber, (ii) the cleaving knife stage towards and away from the one end of the sample holder, and (iii) the cleavage support stage towards and away from the opposite end of the sample holder.

7. The apparatus of claim 2, wherein the chuck comprises a plurality of independently moveable or rotatable sections.

8. The apparatus of claim 1, further comprising a load lock cover, configured to open and close the load lock chamber.

9. The apparatus of claim 1, further comprising an imaging device or other analytical instrument configured to image and/or detect one or more structures or other features in the sample.

10. The apparatus of claim 1, further comprising a vacuum system configured to evacuate the load lock chamber and/or the vacuum chamber.

11. The apparatus of claim 1, wherein the gate valve comprises a gate configured to allow the cleavage module into the vacuum chamber when the gate is open and seal the load lock chamber from the vacuum chamber when the gate is closed.

12. A method for cleaving a sample, comprising:
placing the sample on or in a sample holder, wherein the sample includes one or more materials that are in a liquid phase at ambient temperatures and the sample holder is crystalline;
cooling the sample on the sample holder to a temperature below a melting point of each of the one or more materials that are in the liquid phase at ambient temperatures;
placing the sample holder on a chuck in a cleaving module in a load lock chamber, the cleaving module being configured to cleave the sample holder and the chuck contacting a first surface of the sample holder;
securing the sample holder with the chuck;
inserting the cleaving module with the sample holder and the sample thereon in a vacuum chamber; and
cleaving the cooled sample holder and the sample with the cleaving module.

13. The method of claim 12, wherein the sample is placed on the sample holder and the sample is cooled to the temperature below the melting point of each of the one or more materials before the sample holder is placed on the cleaving module.

14. The method of claim 13, wherein the sample is cooled to the temperature below the melting point of each of the one or more materials in an external freezer or using liquid nitrogen.

15. The method of claim 12, wherein the sample holder is placed on the cleaving module, the sample is placed on the sample holder, and the sample is cooled to the temperature below the melting point of each of the one or more materials in sequence.

16. The method of claim 12, wherein the sample is cooled to the temperature below the melting point of each of the one or more materials using a cryo-cooler operably connected to the cleaving module.

17. The method of claim 12, wherein the cleaving module is inserted into the vacuum chamber through an opening in a gate valve between the load lock chamber and the vacuum chamber, and the opening is configured to allow the cleaving module to enter and exit the vacuum chamber.

18. The method of claim 12, wherein the cleaving module comprises a cleaving knife, and cleaving the sample holder and the sample with the cleaving module comprises initiating a cleavage line in the sample holder at one end of the sample holder with the cleaving knife.

19. The method of claim 18, wherein the sample holder comprises a single crystal material that is at the one end and on which the sample is placed.

20. The method of claim 12, further comprising viewing, imaging and/or analyzing the cleaved sample.

* * * * *